(12) United States Patent  
Asadi et al.

(10) Patent No.: US 7,694,786 B2
(45) Date of Patent: Apr. 13, 2010

(54) DAMPING VALVE WITH A DIRECTIONALLY-DEPENDENT CROSS SECTION

(75) Inventors: Hassan Asadi, Schweinfurt (DE); Harun Tucovic, Dittelbrunn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 939 days.

(21) Appl. No.: 10/981,169

(22) Filed: Nov. 4, 2004

(65) Prior Publication Data

US 2005/0092565 A1 May 5, 2005

(30) Foreign Application Priority Data

Nov. 4, 2003 (DE) ................. 103 51 357

(51) Int. Cl.
*F16F 9/34* (2006.01)
(52) U.S. Cl. ................. 188/322.15; 188/282.6
(58) Field of Classification Search ........... 188/282.1, 188/282.5, 282.6, 283, 313, 316, 317, 319.1, 188/322.13, 322.14, 322.15, 322.22
See application file for complete search history.

(56) References Cited

U.S. PATENT DOCUMENTS

| 3,236,339 A | 2/1966 | Duckett |
| 3,552,429 A | 1/1971 | Dickinson |
| 5,441,133 A | 8/1995 | Murakami |
| 6,079,440 A | 6/2000 | Fenn et al. |
| 2001/0023801 A1 * | 9/2001 | Fenn et al. ............. 188/322.15 |
| 2001/0042664 A1 | 11/2001 | Masamura et al. |

FOREIGN PATENT DOCUMENTS

| DE | 19 79 961 | 2/1968 |
| DE | 40 25 115 | 2/1992 |
| DE | 196 15 584 | 6/1997 |
| DE | 197 12 895 | 10/1998 |
| DE | 197 52 670 | 6/1999 |
| GB | 2 113 355 | 8/1983 |

OTHER PUBLICATIONS

French Search Report dated Aug. 5, 200, issued for FR Application No. 0411745.

* cited by examiner

*Primary Examiner*—Robert A Siconolfi
(74) *Attorney, Agent, or Firm*—Cohen Pontani Lieberman & Pavane LLP (57) ABSTRACT

Damping valve comprising a damping valve body with a through-channel system, which is covered on at least one outlet side by a number of valve disks, where a nonreturn valve disk releases an advance cross section when the damping medium is flowing in one direction and closes off that cross section when the damping medium is flowing in the other flow direction, and where a cover disk with at least one cross section which can be actuated by the nonreturn valve disk limits the lifting movement of the nonreturn valve disk, and where a second cover disk limits the lifting movement of the nonreturn valve disk in the direction opposite that in which the first cover disk works.

5 Claims, 7 Drawing Sheets

Fig.12

DAMPING VALVE WITH A DIRECTIONALLY-DEPENDENT CROSS SECTION

BACKGROUND OF THE INVENTION

1. Field of the Invention

The invention pertains to a damping valve with a directionally-dependent cross section including a damping valve body with an outlet side and at least one through channel; a first cover disk loaded toward the outlet side and having at least one hole aligned with the at least one channel; and a nonreturn valve disk which enables flow of damping medium in one direction through the at least one hole and blocks flow of damping medium in the opposite direction through the at least one hole.

2. Description of the Related Art

In the design of damping valves for vibration dampers, it can be advisable, especially for reasons of comfort, to provide differently sized cross sections, also called advance cross sections for the different flow directions of the damping valve. Several design variants of a damping valve are disclosed in GB 2,113,355. In the variant according to FIG. 2, a nonreturn valve disk with a C-shaped cutout is used, the inside diameter of this disk being held firmly under tension against a piston. An outer ring-shaped part of the nonreturn valve disk can undergo elastic deformation with respect to the central, circular ring-shaped clamping surface. A sealing disk is located concentric to and radially outside of the outer ring-shaped part of the nonreturn valve disk. When damping medium arrives at the outer ring-shaped part of the nonreturn valve disk from the direction of the channels, which open out into a ring-shaped channel, the outer ring-shaped part is pressed against a cover disk, which blocks the flow connection with the working space. When the damping medium arrives from the direction of the cover disk, the outer ring-shaped part is lifted from the cover disk and releases an advance cross section. This design of a directionally dependent advance cross section, which appears quite simple at first glance, turns out to have some problems in practice. For example, there must be a gap between the outer ring-shaped part and the sealing disk radially outside it. Because of its radial area, this gap has a significant effect on the functionality of the advance cross section. In addition, the outer sealing disk is made of thicker material than the valve disk. As a result, the cover disk is deformed at least slightly in the manner of a disk spring, so that the nonreturn valve disk must undergo a comparatively large amount of deformation, which in turn demands a larger gap between it and the radially outer sealing disk. The nonreturn valve disk is subjected to considerable compressive forces in the opening direction, that is, in the direction toward the ring-shaped channel, but forces are not absorbed in any way by the piston or by the radially outer sealing disk. The service life of the nonreturn valve disk therefore tends to be limited.

Figure 7:
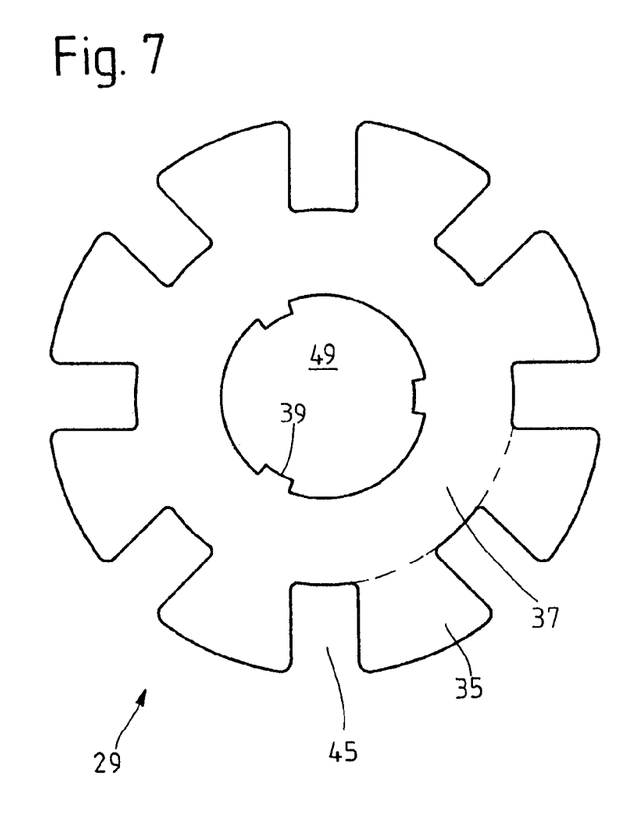
FIGS. 7-9 show several variants of a nonreturn valve disk.

In the variant according to FIG. 7 of GB 2,113,355, a simple closed nonreturn valve disk (without a cutout) is used, which is supported on a sealing disk, which has three arc-shaped openings. The sealing disk is pretensioned toward the piston on its inner and outer diameters; whenever it is desired to achieve a degressive characteristic according to FIG. 5, the surface of the piston will have a certain height offset, i.e., areas at two different heights, so that the outer diameter will be tensioned firmly against the piston. As a result, an undefined gap is formed between the bottom surface of the sealing disk and the nonreturn valve disk; this gap also has an effect on the advance cross section. In this variant, furthermore, there is no stop surface present to limit how far the nonreturn valve disk can travel in the opening direction.

SUMMARY OF THE INVENTION

The task of the present invention is to realize a damping valve for a vibration damper with a directionally dependent cross section, which valve offers a long service live and at the same time has low sensitivity to manufacturing tolerances.

The task according to the invention is accomplished by a second cover disk which limits the lifting movement of the nonreturn valve disk in the direction opposite the direction in which the first cover disk works.

With this advantageous measure, the service life of the nonreturn valve disk can be significantly improved. The maximum open position is achieved regardless of the instantaneous operating pressure, and the closed position is supported by both cover disks.

In another advantageous embodiment of the invention, a contact surface of the first cover disk which is radially on the inside with respect to the through-channel system and a radially outer contact surface rest on the damping valve body. This offers the advantage that no gap which could be superimposed on the effect of the advance cross section is formed between the damping valve body and the first cover disk.

According to an advantageous embodiment, the second cover disk is formed by a disk spring. The damping valve thus has a simple and compact overall design, in which the disk spring ensures that the damping valve tends to have a degressive damping force characteristic even when the first cover disk is lying completely flat on the damping valve. In a further advantageous embodiment, the disk spring has at least one through-opening for the damping medium.

It is also provided that the nonreturn valve disk is supported so that it floats in the axial direction and is pretensioned by the disk spring against the first cover disk. The only movement required of the nonreturn valve disk is to execute the lifting movement for releasing the advance cross section. When the first cover disk, which simultaneously fulfills the function of a damping force-generating valve disk, is lifted from the damping valve body, the nonreturn valve disk can perform its own lifting movement synchronously under little or no tension.

The nonreturn valve disk has a cover area, which can undergo elastic deformation with respect to a clamping surface of the nonreturn valve disk. It is advantageous to provide cutouts between the cover area and the clamping surface to increase the elasticity of a nonreturn valve made of relatively thick material.

In another embodiment, the nonreturn valve disk has a clamping surface located radially on the inside with respect to the cover area and a clamping surface located radially on the outside. The principle of the cutouts is applied twice to this nonreturn valve disk, as a result of which two clamping surfaces on radially opposite sides of the cover area are obtained and comparatively long spring webs are produced.

In another advantageous embodiment of the invention, the disk spring and the cover area of the nonreturn valve disk form a ring-shaped space, which has an outlet connection to allow the damping medium to leave the damping valve. This is associated with a calming of the flow of the damping medium.

The nonreturn valve disk has at least one notch, which forms the outlet connection. One of these notches is in the area of the clamping surface and thus increases the elasticity of the nonreturn valve disk.

The nonreturn valve disk is also provided with centering webs so that it can position itself relative to the damping valve.

In a first variant, the cover area of the nonreturn valve disk rests on the cover disk when the advance cross section is closed.

To prevent an adhesion effect which can be present under certain conditions between the nonreturn valve disk and the first cover disk, a pretensioning disk is installed between the first cover disk and the nonreturn valve disk in the cover area. When the nonreturn valve disk is closed, the cover area is supported on this pretensioning disk. Another key advantage of this variant is that a linear sealing edge is present, which guarantees a reliable sealing function.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
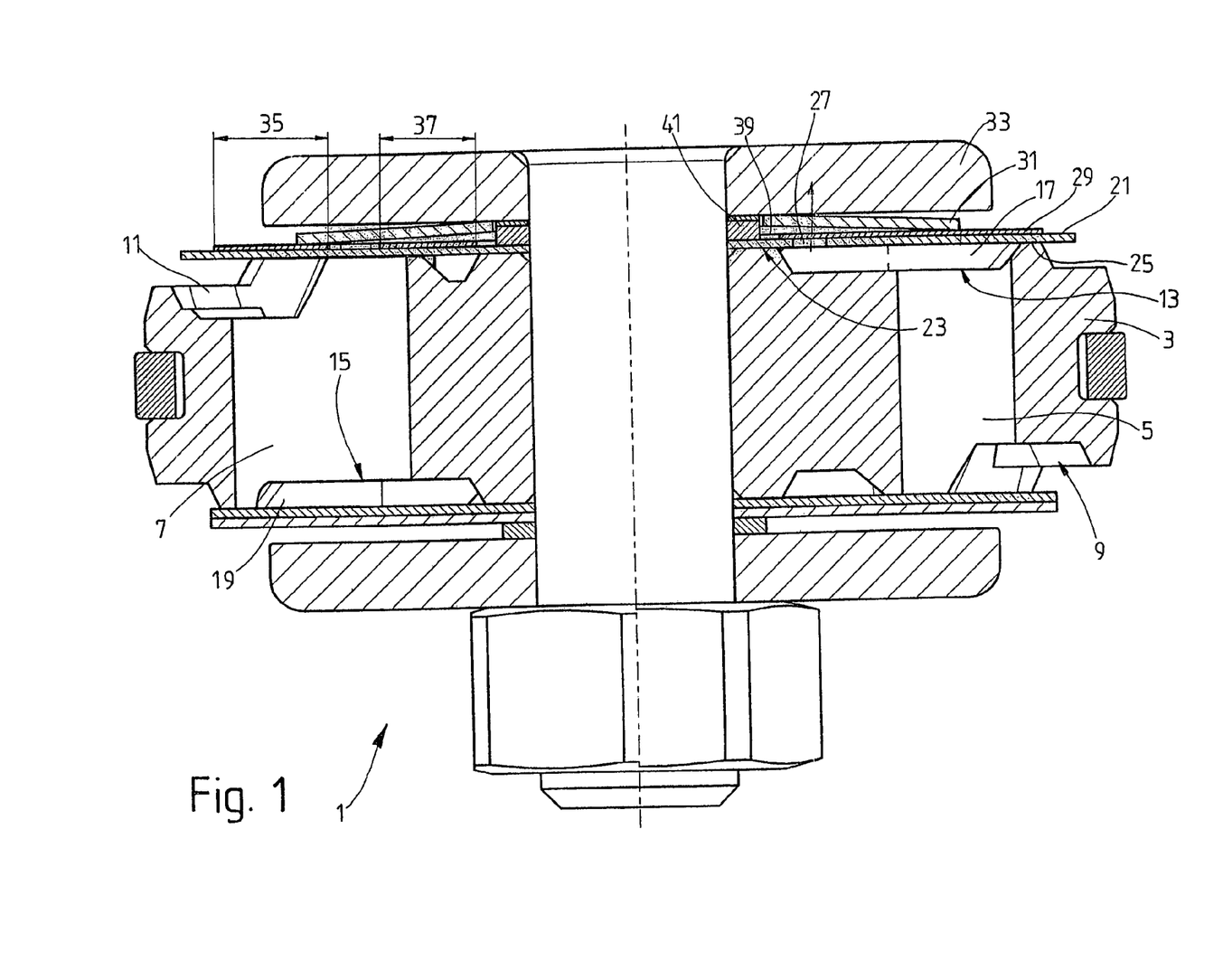
FIG. 1 shows a cross-sectional view of a damping valve.

FIG. 1 shows cross-sectional view of a damping valve 1, especially for a vibration damper. A damping valve body 3 of the damping valve has a through-channel system in the form of axially oriented channels 5, 7, each of which has a tapered inlet 9, 11, and each of which is designed to carry the flow in only one direction by virtue of the fact that the respective outlets 13, 15, which lead to ring-shaped channels 17, 19, are covered by at least one valve disk. Although the ring channels extend all the way around the circumference, the width of each of the two ring channels 17, 19 for the outlets is restricted by the inlet to the axial channel which carries the flow in the other direction. As can be seen on the basis of the inlets 9, 11, the damping medium, e.g., an oil, flows through the damping valve 1 first from one side, then from the other.

Figure 6:
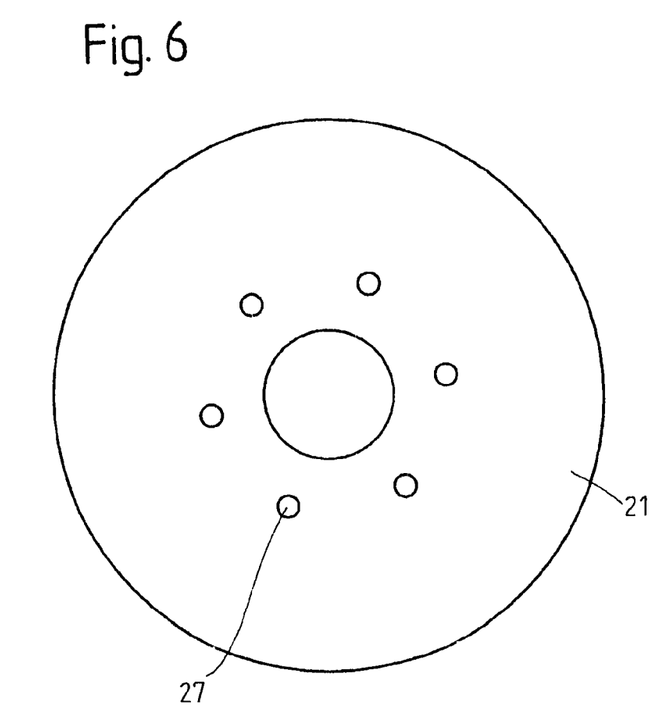
FIG. 6 shows a view of the first cover disk of the damping valve according to FIGS. 1-5.

A first elastic cover disk 21, shown as an individual part in FIG. 6, is laid on one surface of the damping valve body. The cover disk rests on radially inner and radially outer contact surfaces 23, 25 of the damping valve body, the concepts of "radially inner" and "radially outer" being based here on the through-channel system. The cover disk 21 also has a plurality of holes 27, which correspond functionally to an advance cross section, the damping action of which comes into play especially at low flow rates of the damping medium. The pitch circle on which these individual cross sections are located is inside the area defined by the ring-shaped channel 17 of the damping valve body 3.

A nonreturn valve disk 29, which is supported so that it floats in the axial direction, is installed on top of this first cover disk 21. A second cover disk 31 limits the extent to which the nonreturn valve disk can be lifted in the direction opposite that in which the first cover disk 21 works. The nonreturn valve disk 29 can move axially only between the two cover disks 21, 31. The second cover disk 31 is formed by a disk spring, which pretensions the nonreturn valve disk 29 against the first cover disk 21. The spring travel of this disk spring is limited by a rigid stop disk 33, which is permanently attached to the damping valve body 3.

Figure 8:
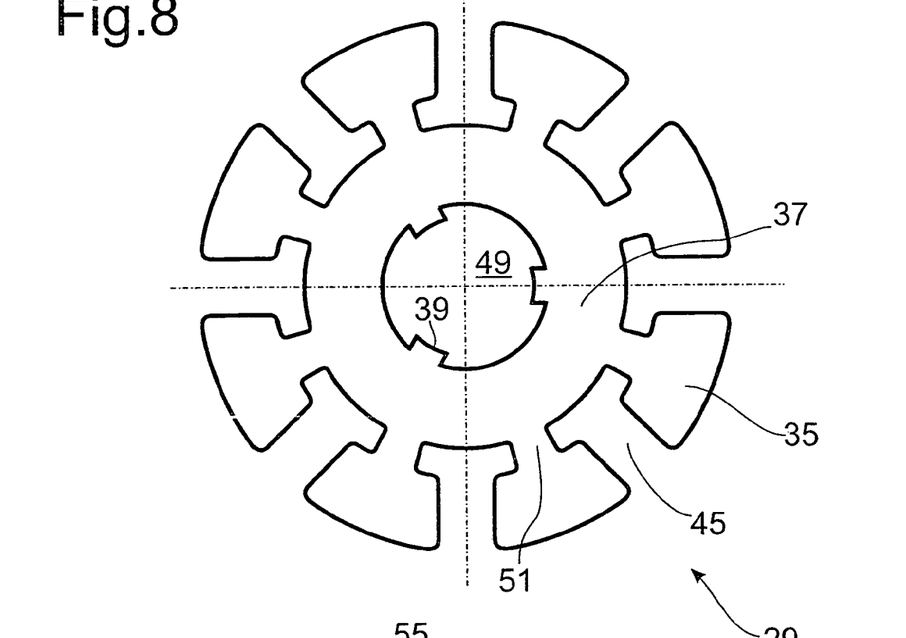
Figure 9:
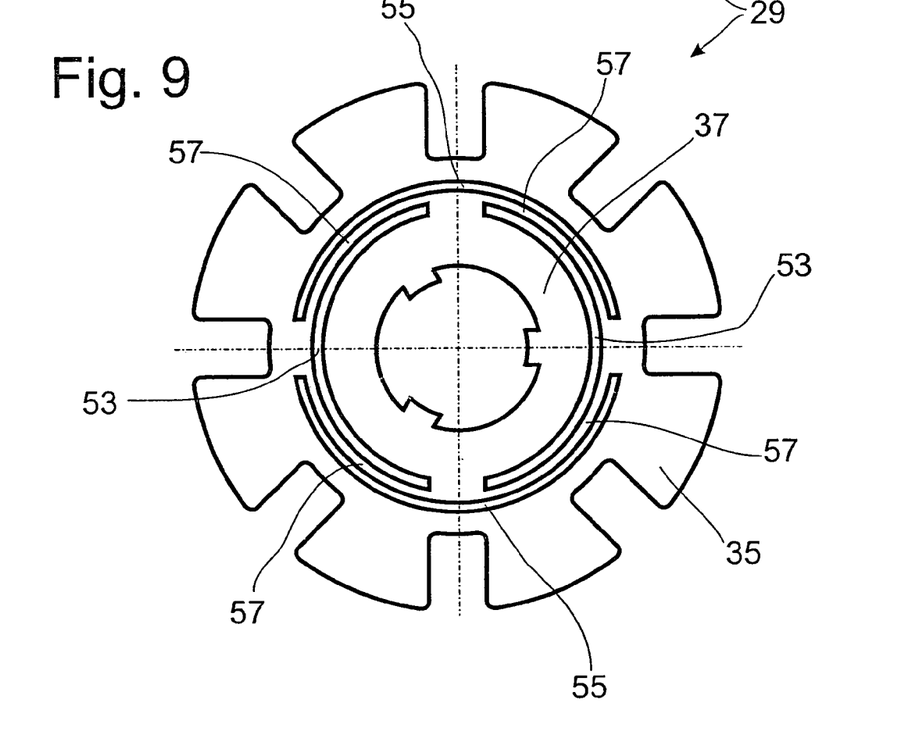

The nonreturn valve disk 29 has a clamping surface 35 and a cover area 37, which can undergo elastic deformation with respect to the clamping surface 35. FIGS. 7-9 show several design variants. So that it can position itself, the nonreturn valve disk 29 is provided radially on the inside with centering webs 39, which are supported against a centering ring 41 of the damping valve.

Figure 2:
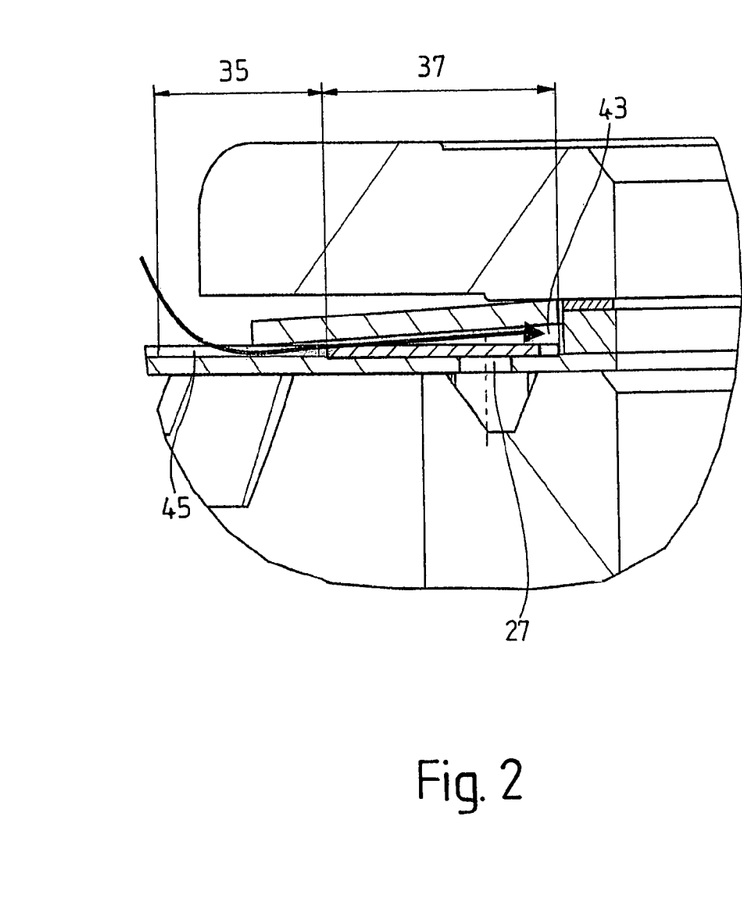
FIGS. 2 and 3 show detailed views of the damping valve according to FIG. 1.
Figure 3:
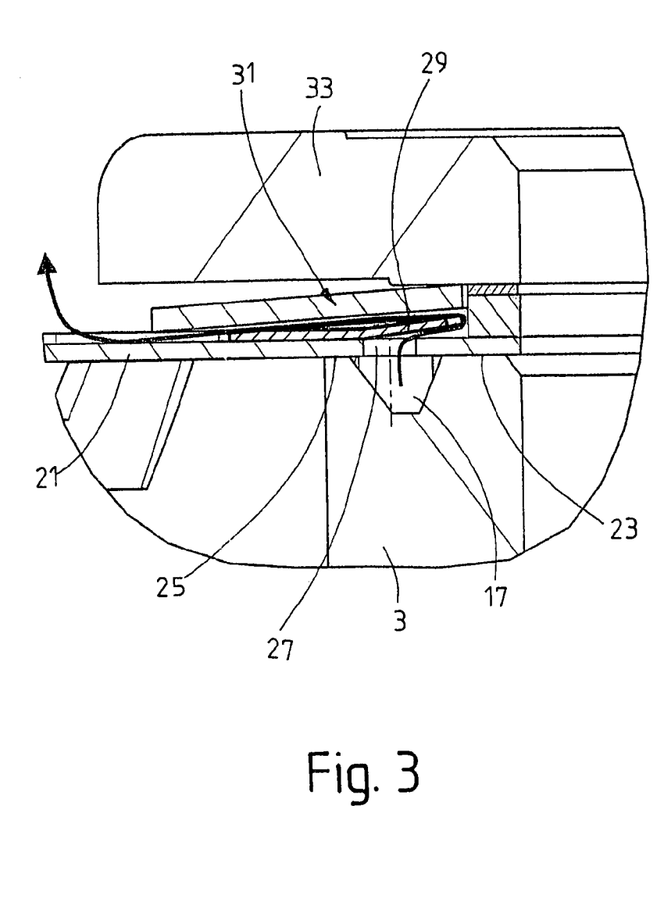

It can seen from the detailed views of FIGS. 2 and 3 that the disk spring 31 and the cover area 37 of the nonreturn valve disk 29 form a ring-shaped space 43, which determines the maximum distance by which the cover area 37 can be lifted. The ring-shaped space also has an outlet connection, which allows the damping medium to leave the damping valve. The outlet connection is formed by at least one notch 45, which is executed in the area of the clamping surface 35.

When the damping medium arrives at the first cover disk 21 at a relatively slow flow rate, the first cover disk remains on the contact surfaces 23, 25 of the damping valve body, as shown in FIG. 2. The damping medium arrives at the cover area 37 of the nonreturn valve disk 29 only through the holes 27. As shown in FIG. 3, the cover area is thus lifted away from its flat position on the first cover disk 21 and arrives in its maximum height, defined by its contact with the bottom surface of the second cover disk 31. The damping medium can leave the damping valve between the nonreturn valve disk 29 and the second cover disk 31 via the notches 45.

When the flow rate of the damping medium becomes strong enough, the first cover disk 21 will be lifted away from the damping valve in the area of the radially outer contact surface 25 in opposition to the pretensioning force of the second cover disk 31, i.e., of the disk spring. The nonreturn valve disk 29 can assume a virtually flat position, because the holes 27 are practically nonfunctional at high flow rates.

When the flow is proceeding in the opposite direction as shown in FIG. 2, it is true that the damping medium can flow into the ring-shaped space 43 between the nonreturn valve disk and the second cover disk via the notches 45 in the nonreturn valve disk 29, but the cover area 37 blocks the flow path leading through the cross sections 27 in the first cover disk 21. These cross sections, which cooperate to form the advance cross section of the damping valve, are thus available for only one flow direction.

Figure 4:
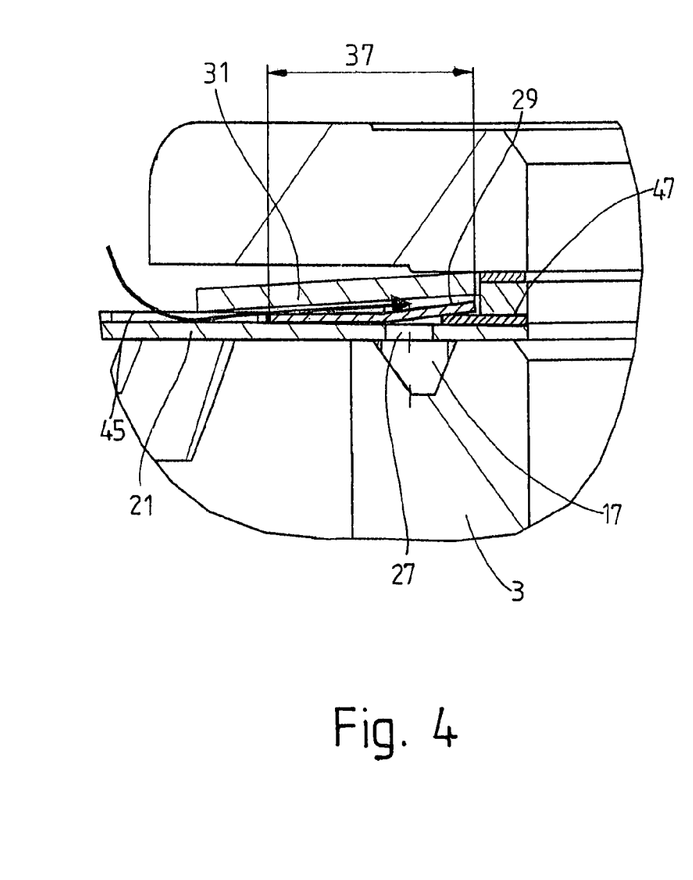
FIGS. 4 and 5 show a damping valve with an additional tensioning disk for the nonreturn valve disk.
Figure 5:
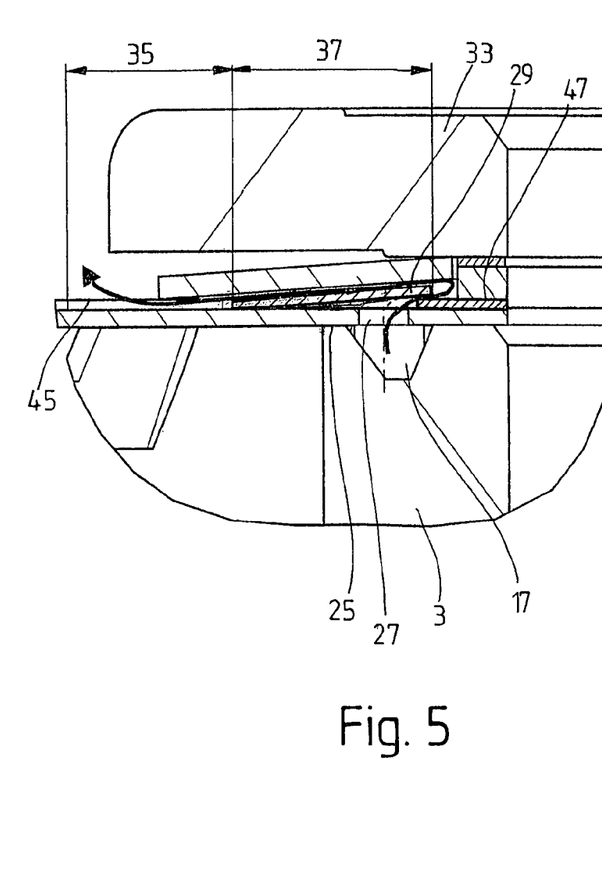

FIGS. 4 and 5 show a modification of the damping valve 1 according to FIGS. 2 and 3, in which an additional preload disk 47 is installed between the first cover disk 21 and the cover area 37 of the nonreturn valve disk 29. The cover area of the valve disk is supported on this additional preload disk. As a result, the cover area 37 is "shielded" slightly with respect to the clamping surface 35, as a result of which linear contact is established between the pretensioning disk 47 and the nonreturn valve disk 29. The preload disk 47 has a smaller diameter than the first cover disk and is clamped tightly in the axial direction against the first cover disk by the stop disk 33, so that no leakage can occur at the nonreturn valve disk. Even if, at higher flow rates, the first cover disk is lifted from the radially outer contact surface 25, the tension inside the nonreturn valve disk does not increase; in fact, the opposite tends to occur, because the clamping surface 35 is lifted to the level of the cover area 37, which has the result of decreasing the pretensioning force exerted by the cover area on the preload disk 47.

FIG. 7 shows the nonreturn valve disk 29 according to FIGS. 1-5 as an individual part. The nonreturn valve disk is designed as a flat disk with a central opening 49 and centering webs 39 so that it can position itself on the damping valve body. A closed, ring-shaped surface, which serves as the cover area 37, surrounds the central opening 49. The notches 45 are provided around the outer edge of the nonreturn valve disk, as a result of which a plurality of segment-like individual clamping surfaces 35 are formed.

FIG. 8 shows a modification of FIG. 7, in which the notches 45 have a T-shaped contour, as a result of which a narrow transition web 51 is formed between the individual clamping surface 35 and the cover area 37.

The nonreturn valve disk 29 according to FIG. 9 has two pairs of semicircular cutouts 53, 55, which are offset from each other. As a result, elastic webs 57 are formed between the individual clamping surfaces 35 and the cover area 37. These webs offer an especially high degree of elasticity, and this creates a favorable relationship between the pretensioning forces and the achievable lifting distance. The selection of the nonreturn valve disk 29, that is, the selection of a disk according to FIG. 7, FIG. 8, or FIG. 9, depends on the amount of radial space available for the damping valve body.

Figure 10:
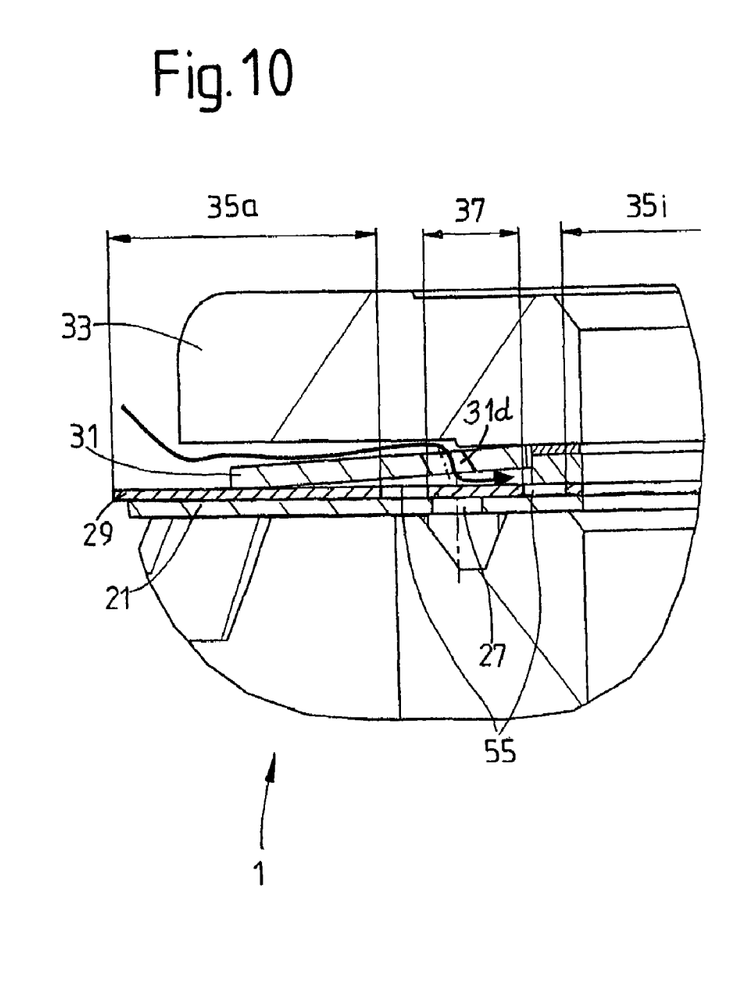
FIGS. 10 and 11 show detailed views of the damping valve according to FIG. 1 with a through-opening in the disk spring.
Figure 11:
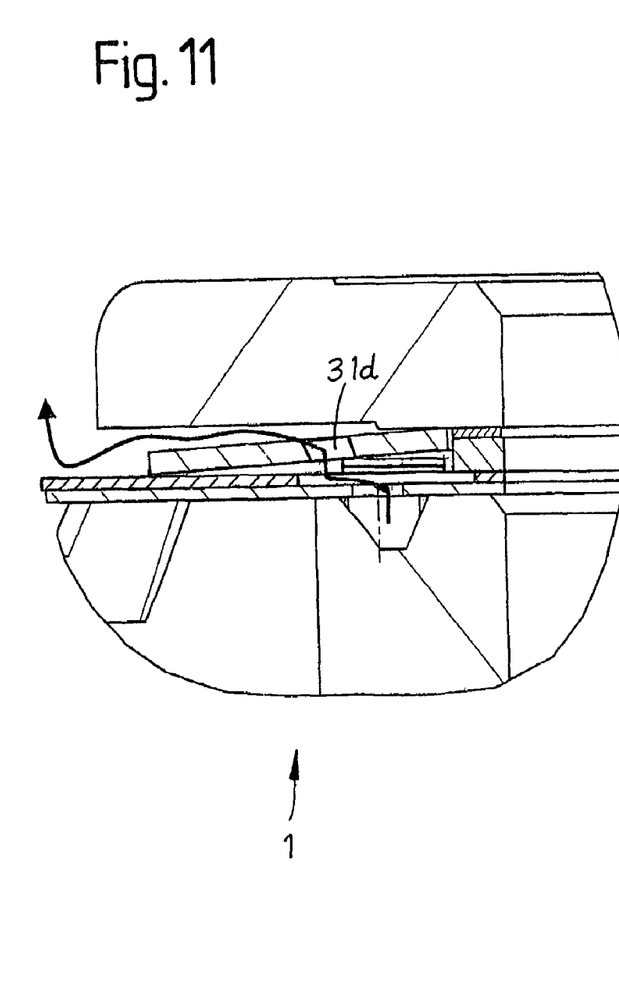
Figure 12:
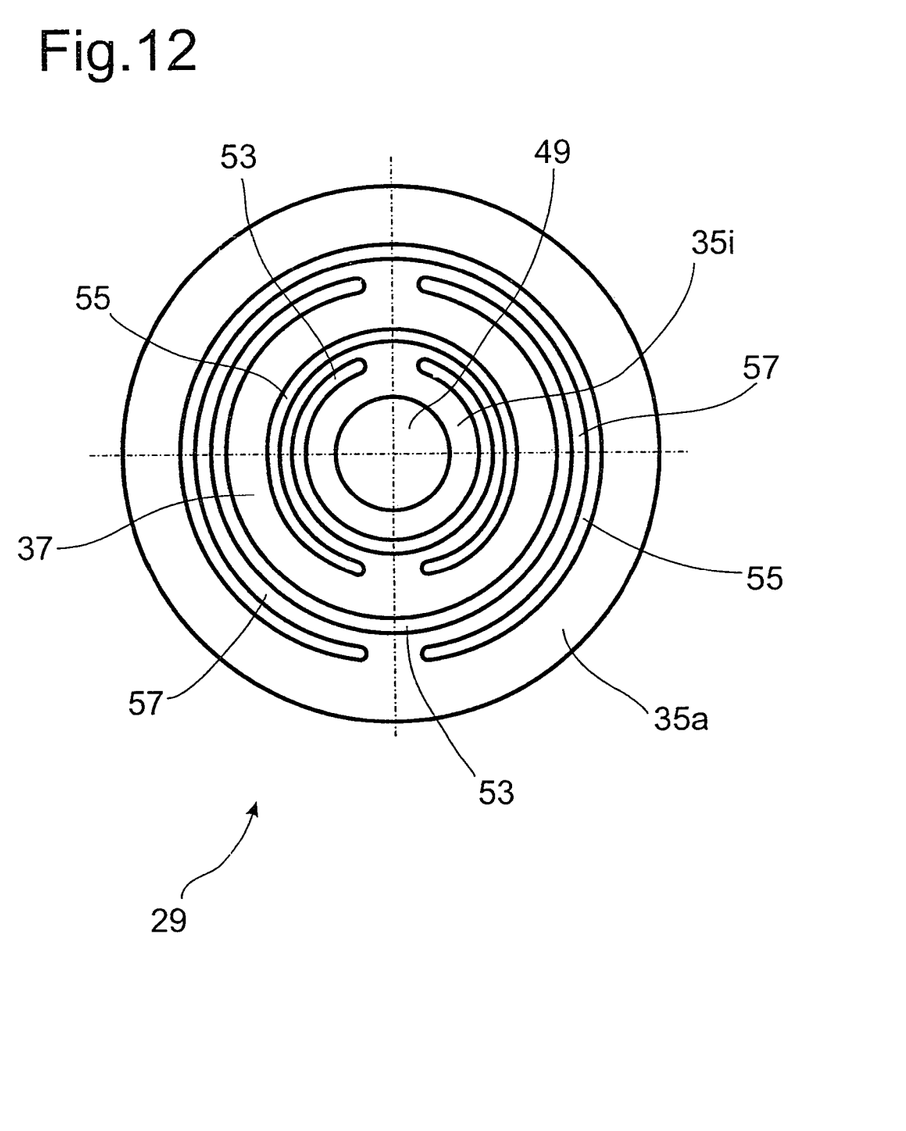
FIG. 12 shows a nonreturn valve disk for the damping valve according to FIG. 10.

FIGS. 10 and 11 show a detailed view of a modification of the damping valve 1 according to FIG. 1. Through-openings 31d have been introduced to improve the flow of the damping medium through the disk spring. In addition, this damping valve has a nonreturn valve disk 29 of the type shown in FIG. 12, which is based on the principle of FIG. 9. Here, however, the semicircular cutouts 53, 55 are more nearly circular, and they again form the boundaries of elastic webs 57, so that, with respect to the cover area 37, a radially inner clamping surface 35i and a radially outer clamping surface 35a are formed, each of which is connected by the elastic webs 57 to the cover area. When the cover area 37 is lifted by the damping medium, it therefore remains more-or-less parallel to the first cover disk 21 and in the process releases the cross sections 27. FIG. 10 shows the closed operating position. The damping medium flows between the disk spring 31 and the stop disk 33, then through the through-opening 31d, and finally arrives at the cover area 37, which closes the cross sections 27 in the first cover disk 21.

In FIG. 11, the damping valve 1 according to FIG. 10 is shown as the damping medium is flowing through the cross sections 27 in the opposite direction. The cover area 37 has been lifted to the maximum extent, so that it is now resting against the bottom surface of the disk spring 31. The damping medium can leave the damping valve through the through-openings 31d in the disk spring. The cross section available here is much larger than that offered by the notches 45, and it is independent of the elastic state of the disk spring 31.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A damping valve comprising:
    a damping valve body with at least one though channel having an outlet area;
    a first cover disk covering the outlet area and having at least one hole;
    a nonreturn valve disk supported on the first cover disk and having a clamping surface with at least one notch and a cover area which extends over the at least one hole and is deformable with respect to the clamping surface in a direction away from the first cover disk such that flow of damping medium is enabled in one direction though said at least one hole and flow of damping medium is blocked in the opposite direction though said at least one hole, wherein the nonreturn valve disk comprises a central opening and a plurality of centering webs extending radially into said opening, said centering webs centering said nonreturn valve disk with respect to said damping valve body; and
    a second cover disk formed as a disk spring which loads the nonreturn valve disk toward the first cover disk, the disk spring and the cover area of the nonreturn valve disk forming a ring-shaped space, the notch forming an outlet connection of the ring-shaped space, wherein the enabled flow of damping medium flows through the though channel, the at least one hole, the ring-shaped space, and the notch, while the disk spring holds the clamping surface.

2. A damping valve as in claim 1 wherein said first cover disk has an inner contact surface located radially inside of said at least one though channel, and an outer contact surface located radially outside of said at least one through channel, said inner and outer contact surfaces resting on said damping valve body.

3. A damping valve as in claim 1 wherein the disk spring has at least one though opening for damping medium.

4. A damping valve as in claim 1 wherein the nonreturn valve disk has an inner clamping surface located radially inside of said cover area, and an outer clamping surface located radially outside of said cover area.

5. A damping valve as in claim 1 further comprising a preload disk located between the first cover disk and the nonreturn valve disk, the cover area being supported on the preload disk when the nonreturn valve disk blocks flow.

* * * * *